United States Patent
Mukherjee et al.

(10) Patent No.: US 6,449,474 B1
(45) Date of Patent: Sep. 10, 2002

(54) METHOD AND APPARATUS FOR CALL INTERCEPTION CAPABILITIES FOR USE WITH INTELLIGENT NETWORK SERVICES IN A COMMUNICATIONS SYSTEM

(75) Inventors: Probal Mukherjee, Plano; James Brian Welling, Jr.; Rosemary McGowan, both of Richardson, all of TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/443,848

(22) Filed: Nov. 19, 1999

(51) Int. Cl.[7] .................................................. H04M 1/24
(52) U.S. Cl. ................ 455/414; 455/415; 455/417; 455/422; 455/560; 379/7; 379/32.01; 379/35; 379/201.01; 379/211.01; 379/221.08; 379/221.09
(58) Field of Search ................... 379/32.01, 35, 379/7, 32.05, 201.01, 211.01, 213.01, 221.08, 221.09; 455/405, 415, 414, 417, 430, 410, 422, 560

(56) References Cited

U.S. PATENT DOCUMENTS

| | | | | |
|---|---|---|---|---|
| 5,590,171 A | * | 12/1996 | Howe et al. | 379/33 |
| 5,881,132 A | * | 3/1999 | O'Brien et al. | 379/35 |
| 5,923,744 A | * | 7/1999 | Cheng | 379/207 |
| 5,937,345 A | * | 8/1999 | McGowan et al. | 455/410 |
| 6,097,798 A | * | 8/2000 | Albers | 379/114 |
| 6,122,499 A | * | 9/2000 | Magnusson | 455/405 |
| 6,229,887 B1 | * | 5/2001 | Albers et al. | 379/219 |

* cited by examiner

*Primary Examiner*—Thanh Cong Le
*Assistant Examiner*—Andrew Harry

(57) ABSTRACT

A method and apparatus in a communications system for providing call interception. A call is received at a switch in the communications system. Responsive to the call involving a service using identification numbers unknown to the communications system, a remote database associated with the service is queried, wherein the remote database contains a plurality of identification numbers. A result is received from the remote database in response to querying the remote database. A call interception service is initiated based on the result.

47 Claims, 7 Drawing Sheets

METHOD AND APPARATUS FOR CALL INTERCEPTION CAPABILITIES FOR USE WITH INTELLIGENT NETWORK SERVICES IN A COMMUNICATIONS SYSTEM

FIELD OF THE INVENTION

The present invention relates generally to an improved communications system and in particular to a method and apparatus for call interception in a communications system. Still more particularly, the present invention relates to a method and apparatus for providing call interception for a call using intelligent network services.

BACKGROUND OF THE INVENTION

Call intercept is a mechanism of tracking subscribers based on their identification number. This mechanism is used in communications network, such as a global system for mobile communications (GSM) network. Prior to the introduction of intelligent networking (IN) into GSM networks, call interception required the identity of the mobile subscriber to be known to the monitoring agency either in the form of an international mobile subscriber identity (IMSI) or a mobile subscriber integrated services digital network number (MSISDN). With the advent of IN technology, services may be created which subscribers can access by using either their regular GSM phones or using some other access methods to trigger the services in the network. These other access methods may include, for example, a pay phone or a landline. In such an instance identification numbers recognized by the GSM network are not used to access IN services. These IN services include, for example, voice mail, personal number service (PNS), virtual private network (VPN), and geo-zone.

With call termination through an IN subscriber, the calling party need not dial the MSISDN of the GSM subscriber. Further, a mobile subscriber might hide behind some number, which is unknown to the GSM specifications. These numbers may be, for example, a virtual private number (VPN) or a personal number service (PNS) number. During call setup in a GSM-IN network, the alias numbers may not be known to the law agency.

A subscriber may be known by its IMSI or MSISDN to the law agency, but IN services have allowed the subscriber to have other numbers too. No mechanism is present in GSM networks to correlate these different numbers. For example, with an IN service that provides "home services in which the subscriber has a zone called "home". When the subscriber is located at "home", this IN service provides a more favorable rate to a subscriber. In this area, the mobile station can receive or originate calls at a low rate. With this service IN, a local number portability (LNP) number is introduced into the GSM network. The location of the mobile station is important with this IN service. For termination calls, if the mobile station is subscribed to the service and is currently out of the home zone, all calls to the mobile station using the LNP will be routed to a voice mail number. If the mobile number is called via its MSISDN number, the mobile station can be reached anywhere independent of its position. No mechanism is present in the GSM network to map the LNP number to an IMSI or MSISDN number. As a result, tracking the subscriber becomes impossible. For originating calls using this service, a caller dials any number. If the mobile station is only identified by its LMP number, then tracking or call interceptive calls of the originator becomes difficult. As a result, a malicious mobile subscriber may allude monitoring agencies. Given this situation, a subscriber has the capability to remain anonymous to a law enforcement agency if all that is known to the law agency is the LNP number or some private number of the subscriber.

Thus, it would be advantageous to have an improved method and apparatus for providing call interception for calls involving IN services.

SUMMARY OF THE INVENTION

The present invention provides a method and apparatus for use in intercepting calls involving subscribers having numbers that are unknown within a wireless communications system. A first number is provisioned or indicated for call interception within the mobile switching center. The first number is associated with a second number. The second number is also referred to as an "alias" for the first number. When a call to the second number is originated at a mobile switching center from a mobile station involving a service, such as an IN service, a message is sent to a service control point that is involved in providing the service. The second number is sent in the message. A result in a return message from the service control point is received by the mobile switching center. This return message will include the first number and will result in initiation of call interception of the call.

These processes may be applied to the use of all numbers assigned to or associated with a subscriber. The numbers and the association between the numbers is stored in a database. When a call using a number is made, the database containing the numbers associated with the subscriber can be queried when a call is made to see if an alias for the number has been provisioned for call intercept. If an alias for the number has been provisioned in the database, the alias is returned to the switch handling the call. The alias also is provisioned in the switch and the return of the number is used to find an entry or data structure in the switch containing call intercept information used to initiate call intercept.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
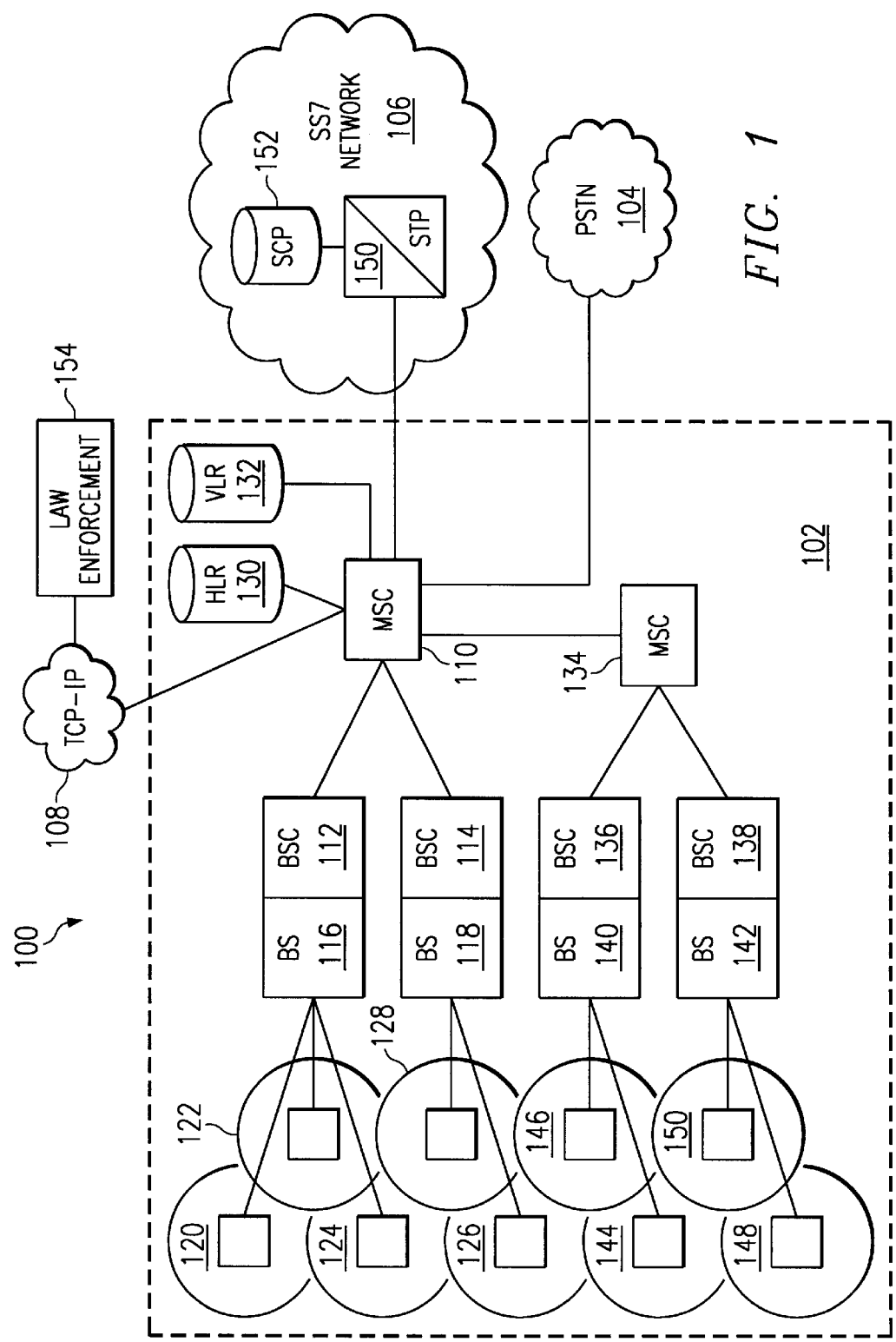
FIG. 1 is a communication system illustrated in which the present invention may be implemented.

With reference now to the Figures and in particular preference to FIG. 1, a communication system is illustrated in which the present invention may be implemented. Communication system 100 includes a GSM network 102 that is connected to a public switched telephone network (PSTN), signaling system 7 (SS7) network 106 and a TCP-IP network 108.

GSM network 102 in this example includes a mobile switching center (MSC) 110, which is connected to base station controller (BSC) 112 and BSC 114. An MSC provides switching and call processing functions in GSM network 102. A BSC is used to locate mobile stations to the cell with the highest signal strength, perform call set up, call supervision, and call termination. A BSC typically includes speech processing units, a call controller, a central processor, a maintenance and test unit, and digital trunk interfaces. BSC 112 is connected to base station (BS) 116 while BSC 114 is connected to BS 118. This example, BS 116 provides communications through mobile stations located within cells 120–124 while BS 118 provides communications to mobile subscribers in cells 126 and 128. A base station, also referred to as a base transceiver subsystem is a system of radio frequency (RF) transceivers and interfaces between a BSC and itself.

MSC 110 includes a connection to a home location register (HLR) 130. HLR 130 is a database used to store information regarding the users of GSM network 102. MSC 110 contains a visitor location register (VLR) 132, which is a database used to store information regarding mobile stations being used in a coverage area in which the mobile stations are not normally registered to operate. Information about a "visiting" mobile station are stored in VLR 132.

In this example, MSC 110 is connected to another MSC 134, which is connected to BSCs 136 and 138. In this example, BS 140 is controlled by BSC 136 while BS 142 is controlled by BSC 138. BS 140 provides communications for cells 144 and 146, while BS 142 provides communications for mobile stations located in cells 148 and 150.

GSM network 102 is connected to PSTN 104 through a connection from MSC 110 to PSTN 104 to provide communication with landline terminals. MSC 110 also has a connection to SS7 network 106 through signal transfer point (STP) 150 which may provide access to service control point (SCP) 152. MSC 110 functions as a service switching point (SSP) to allow communication between MSC 110 and STP 150. A SSP is a local exchange in a telephone network and may be a combination of a voice switch and a SS7 switch, or an adjunct computer connected to the local exchange's voice switch. A SSP provides the functionality of communicating with the voice switch via the use of primitives and creating the packets, or signal units, needed for transmission in the SS7 network. A SSP converts signaling from the voice switch into SS7 signaling messages, which then can be sent to other exchanges through a SS7 network. In the case of accessing a database, the SSP will send database queries through the SS7 network to computer systems located in the network. A SCP provides an interface to various databases and other functions. A SCP is usually a computer used as a front end to a database system. A STP serves as a router in a SS7 network. A STP is also typically adjunct to a voice switch. Many tandem switches provide the capability of voice switching through the switch and SCP functionality through the use of an adjunct computer.

In this example, MSC 110 includes a communications link to TCP-IP network 108, which includes a connection to law enforcement agency 154. This link is used to send all intercept information to law enforcement agency 154.

Figure 2:
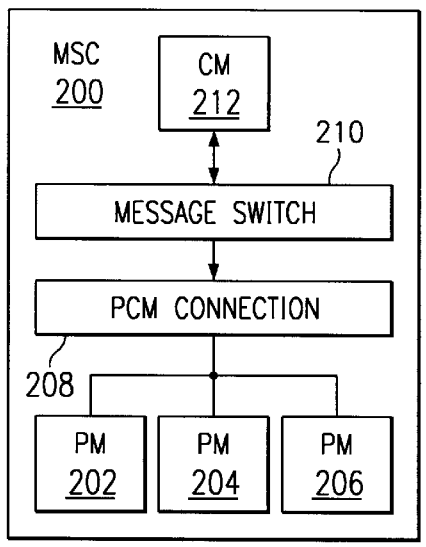
FIG. 2 is a block diagram of a mobile switching center (MSC) depicted in accordance with a preferred embodiment of the present invention.

With reference now to FIG. 2, a block diagram of a mobile switching center (MSC) is depicted in accordance with a preferred embodiment of the present invention. MSC 202 is an example of an MSC in which some processes of the present invention may be implemented. MSC 202 includes peripheral modules (PM) 202–206, which provide an interface to BSCs. These PMs are also referred to as "link interface units". Pulse code modulation connection 208 provides a connection to PMs 202–206. Message switch 210 is used to provide switching functions in MSC 200. Computing module (CM) 212 is an application that runs in MSC 200 to provide various switching services and controls message switch 210. In the depicted example the processes of the present invention may be implemented within CM 212. The various services provided by CM 212 are executed on a data processing system within MSC 200.

Figure 3:
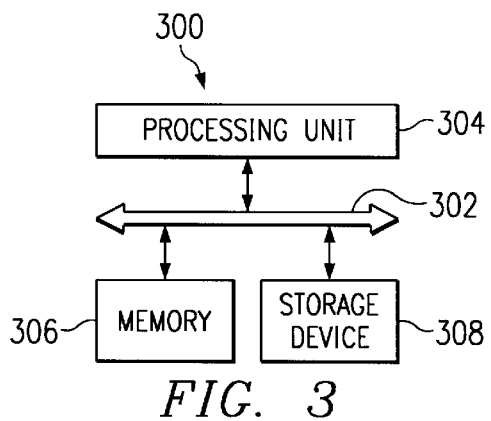
FIG. 3 is a block diagram of a communications system on which the computing module (CM) may run depicted in accordance with a preferred embodiment of the present invention.

Turning to FIG. 3, a block diagram of a data processing system on which the CM may run is depicted in accordance with a preferred embodiment of the present invention. Data processing system 300 includes a bus 302, which is connected to a processing unit 304, a memory 306, and a storage device 308. Processing unit 304 may contain one or more processors, such as, for example, a Pentium III processor from Intel Corporation. Processing unit 304 executes instructions contained in memory 306 for CM 212 in FIG. 2. Data and other information may be located within storage device 308, which may take various forms, such as, for example, a hard disk, DVD-ROM, or a tape drive. In the depicted example, storage device 308 may store tables or databases used for call intercept services.

The present invention provides a method, apparatus, and instructions for following interception involving intelligent networking services. In particular, the mechanism of the present invention may be implemented in a GSM network, such as GSM network 102 in communication system 100 in FIG. 1 to intercept calls involving IN services. In intercepting calls using IN services, a law agency would obtain a number suspect to be used for illegal purposes or by a subscriber who is suspected of illegal activities. This number might be in the form of a PNS, LNP, or a number in a private format. The number is provisioned in a SCP in a SS7 network providing the IN services. The number also is provisioned into each MSC along with other call intercept information such as the number of the monitoring center for the law enforcement agency. In the depicted example, the SCP provides storage for all of the different numbers by which a subscriber is known. The SCP includes a mapping function to tie or associate the provisioned number with a subscriber in the database. When a subscriber originates or terminates a call involving IN services, the MSC contacts the SCP and sends a number to the SCP. The SCP will send back a provisioned number by which the subscriber is known. Upon receiving this provisioned number, the SCP may use a local table or database to retrieve other call intercept related information and initiate monitoring of the call.

Subscribers not using IN services would use the presently available call interception mechanism while those involving IN services would use the mechanism of the present invention. The presently available system involves checking a table or database in the MSC to see if a mobile station is marked for monitoring when a location update is performed by the mobile station. This database stores an IMSI or MSISDN. This system, however, does not work with IN services involving intelligent peripherals (IP) on a SS7 network. The mechanism of the present invention involves the use of a SCP in monitoring calls for law agencies.

A mechanism is present for imputing a number designed by GSM specifications to track a subscriber. Along with the subscriber identity, information as to how the call is to be routed to a law enforcement agency along with other call intercept related data. A number of different law agencies may monitor a single subscriber.

Figure 4:
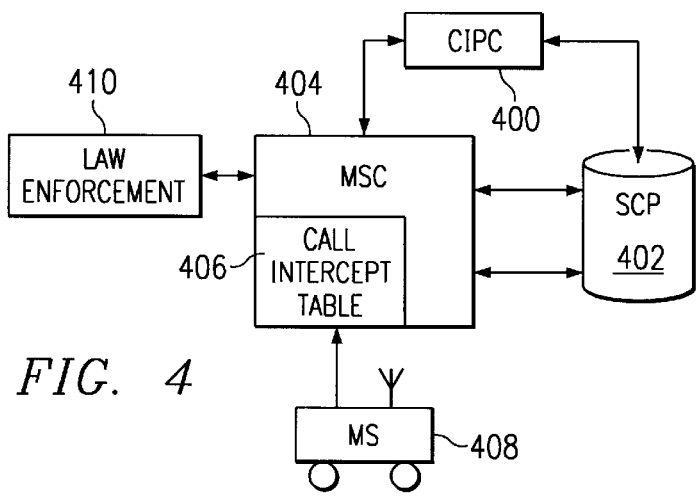
FIG. 4 is a block diagram illustrating call intercept for originating a call involving an intelligent network (IN) service depicted in accordance with a preferred embodiment of the present invention.

With reference now to FIG. 4, a block diagram illustrating call intercept for originating a call involving an IN service is depicted in accordance with a preferred embodiment of the present invention. In this example, a target of the call intercept is the originator of the call. To intercept IN calls, a number for a suspect is identified. The number may be, for example, a PNS, a VPN, or a number in a private format. A call intercept provisioning center (CIPC) 400 is used to provision or data fill the information for a SCP 402 in the network. These types of numbers are not used in the GSM network. In this example, the information provisioned in SCP 402 is the number for the suspect. Of course, depending on the implementation, multiple numbers may be provisioned into SCP 402 for the suspect. CIPC 400 also is used to provision the number into the MSC 404 along with other CI information, such as, the call monitoring center number that is to monitor the call when call intercept occurs and data that is to be collected during the call intercept.

In the depicted example, the number and the call intercept information is provisioned or placed into table 406. SCP 402 is used as a database of all different numbers that a subscriber may use. A mapping function is used within the SCP to tie this number with a subscriber in the database.

When a subscriber at mobile station 408 originates a call using an IN service, MSC 404 will contact the SCP 402. The communications between MSC 404 and SCP 402 are established using customized application for mobile enhanced logic (CAMEL). SCP 402 will determine whether the number called has other aliases or associated numbers that have been provisioned through CIPC 400. If such a number is present, then the number will be returned in the response to MSC 404. Upon receipt of this number MSC 404 searches call intercept table 406 to identify the corresponding entry for the returned number to retrieve other call interception related information. Then the call may be monitored. In this example, the call intercept information also may include an identification of the law enforcement agency or agencies to receive call intercept information, a number for connecting to the law enforcement agency, and the type of data to be sent to the law enforcement agency. In this example, the call intercept includes sending data to law enforcement agency 410. Communication with law enforcement agency 410 is achieved by establishing a communications link using a TCP/IP protocol. Although the depicted example illustrates call interception information being stored in a table, this information may be stored in other types of data structures, such as, for example, a database containing call intercept information.

Figure 5:
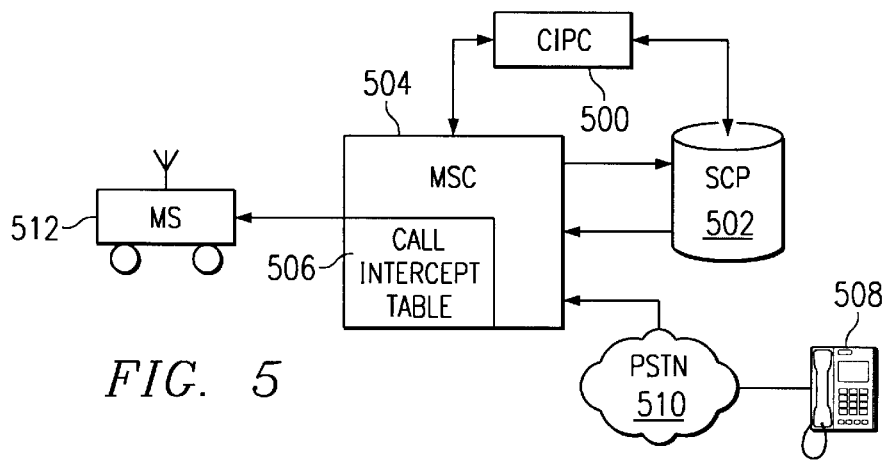
FIG. 5 is a block diagram illustrating call intercept for terminating a call involving an IN service depicted in accordance with a preferred embodiment of the present invention.

Next in FIG. 5, a block diagram illustrating call intercept for terminating a call involving an IN service is depicted in accordance with a preferred embodiment of the present invention. In this example, the target of the call intercept is a recipient of a call. In this example, CIPC 500 is used to provision a number that is to be subject to call intercept into SCP 502 and into MSC 504. In MSC 504, the number is provisioned into call intercept table 506 along with other call intercept information. In this example, a call, originating from a landline based terminal 508 in PSTN 510 is made to a number that involves an IN service. For example, a number may be an 800 number that causes one or more numbers to be called. The 800 number may result in a call to a subscriber's office, to the subscriber's home, to the subscriber's mobile station. In this instance, the 800 number of the subscriber is known and provisioned, but the subscriber's mobile station number is unknown for one reason or another. If the number is for the subscriber's mobile station, SCP 502 will initiate the call to the subscriber's mobile station, mobile station 510 through MSC 504. If the number for the mobile station is provisioned for call intercept in SCP 502, this number will be sent to MSC 504 in the signaling used to initiate the call to mobile station 510. Upon receiving the number MSC 504 will check call intercept table 506 to see if an entry is present for the number. If the number is present in call intercept table 506, then call intercept of the call is initiated.

Figure 6:
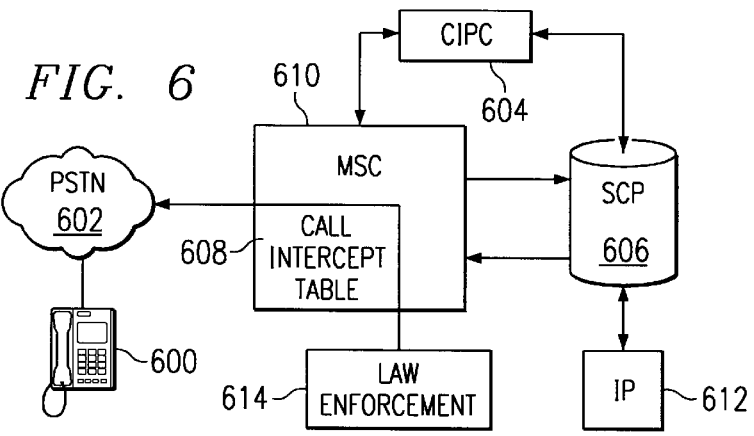
FIG. 6 is a diagram illustrating call intercept of a call made accessing IN services depicted in accordance with a preferred embodiment of the present invention.

Turning now to FIG. 6, a diagram illustrating call intercept of a call made accessing IN services is depicted in accordance with a preferred embodiment of the present invention. In this example, a subscriber may access an IN service, such as, for example, calling card based billing for long distance calls. In such a case, a subscriber may call in from a remote terminal such as telephone 600 in PSTN 602. Telephone 600 is unknown to a law enforcement agency and may be any telephone within PSTN 602. In this case, the law enforcement agency using CIPC 604 has provisioned the subscriber's mobile number into SCP 606 and into call intercept table 608 in MSC 610. The call by the subscriber by telephone 600 results in voice mail being accessed through intelligent peripheral (IP) 612. In this example, the subscriber may call in using an 800 number and access services through a personal identification number (PIN) and a password. In this case, the subscriber's mobile number is not used.

In response to the call using an IN service, the MSC will contact SCP 606 in providing the service. SCP 606 will identify the subscriber's account based on the PIN and password. The subscriber's number is contained in the subscriber's account information. SCP 606 will check to see if the subscriber's mobile number has been provisioned. If the number has been provisioned, the number will be returned to MSC 610. In turn, MSC 610 checks call intercept table 608 to find the entry corresponding to the returned number. Upon finding the entry, call intercept is initiated and a connection is made to law enforcement agency 614 as identified in the call intercept information in the entry for the number found in call intercept table 608. In this manner, the present invention allows call intercept for a call involving a subscriber's account in which the call does not use any number associated with the subscriber's number.

Figure 7:
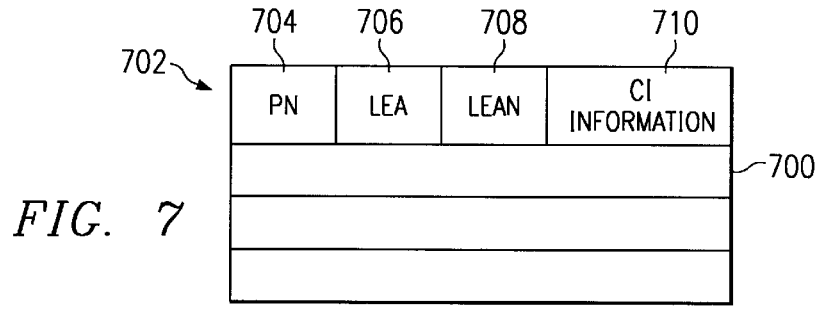
FIG. 7 is a diagram of a call intercept table depicted in accordance with a preferred embodiment of the present invention.

Turning next to FIG. 7, a diagram of a call intercept table is depicted in accordance with a preferred embodiment of the present invention. Call intercept table 700 is an example of a call intercept table that is may be found in a MSC to initiate call intercept of a call. In this example, call intercept table 700 includes an entry 702, which contains the provisioned number in provisioned number (PN) field 704. The number put into PN field 704 may take various forms, for example, a IMSI, a MSISDN, a LNP, or a PNS. The identification of the law enforcement agency is found in law enforcement agency (LEA) field 706. The number for connection to the law enforcement agency is found in LEA number (LEAN) field 708. Other call intercept information is found in field 710. This information may include, for example, the information that is to be collected from the call. For example, statistics as to the time, date, and duration of the call may be recorded and sent to the law enforcement agency. Additionally, the actual call itself may be sent to the law enforcement agency for recording and review. LEA field 706 and LEAN field 708 may contain more than one law enforcement agency that is to be contacted.

Figure 8:
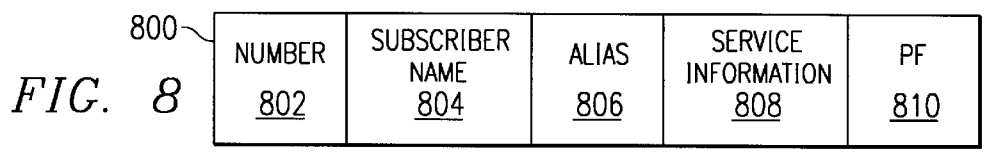
FIG. 8 is an example of a record in a service control point (SCP) depicted in accordance with a preferred embodiment of the present invention.

Turning next to FIG. 8, an example of a record in a SCP is depicted in accordance with a preferred embodiment of the present invention. Record 800 in this example includes a number 802, which is a number for the subscriber, a subscriber name 804, aliases 806, service information 808, and provisioning flag (PF) 810. Aliases 806 contains other numbers associated with the subscriber. Service information, such as, for example, the type of services accessible by the subscriber, is found in service information 808. Additionally, PIN and password information may be included. PF 810 is used to indicate whether a number is provisioned for call intercept. Although the depicted example illustrates a particular order for the information, this information can be placed in any order and may be indexed for searching based on different portions of the record. For example, the record may be indexed by number 802 or by alias 806.

Figure 9:
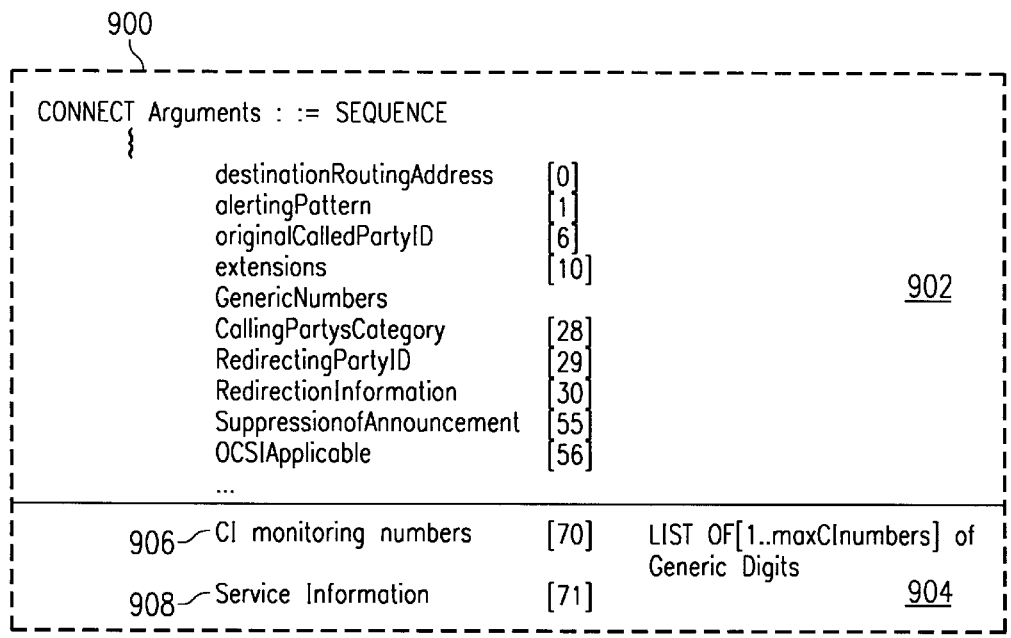
FIG. 9 is a diagram illustrating a message sent from a SCP to a mobile switching center (MSC) containing call intercept information depicted in accordance with a preferred embodiment of the present invention.

With reference now to FIG. 9, a diagram illustrating a message sent from a SCP to a MSC containing call intercept information is depicted in accordance with a preferred embodiment of the present invention. Message 900 is an example of a connect message sent to a MSC from a SCP. Message 900 is an example of a message used under a transaction capabilities part (TCAP) protocol.

In this example, connect arguments used to send new information to a switch is depicted in accordance with a preferred embodiment of the present invention. Section 902 contains arguments that are presently found in a connect message while arguments in section 904 are those used to provide call intercept information in accordance with a preferred embodiment of the present invention. Section 904 includes call intercept monitoring numbers 906 and service information 908. Service information 908 identifies the type of IN service involved. Similar additions may be made to other types of messages for other CAMEL application part (CAP) operations. For example, these types of arguments may be added to establish temporary connection (ETC) messages and continue messages. These are both messages from the SCP to the SSP. An ETC message is used in situations in which a temporary connection is needed. For example, when a caller calls to obtain a balance or number of minutes left on a calling card, an ETC is used.

Figure 10:
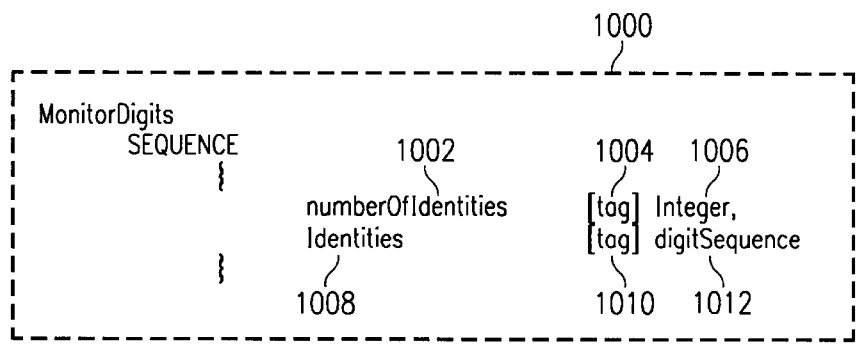
FIG. 10 is an illustration of a format for call intercept monitoring numbers in a message sent from a SCP to a MSC depicted in accordance with a preferred embodiment of the present invention.

With reference now to FIG. 10, an illustration of a format for call intercept monitoring numbers in a message sent from a SCP to a MSC is depicted in accordance with a preferred embodiment of the present invention. Data structure 1000 contains a number of identities 1002 associated with a tag 1004 in which the number of identities is indicated by an integer 1006. Identities 1008 are associated with a tag 1010 with a digit sequence 1012.

Figure 11:
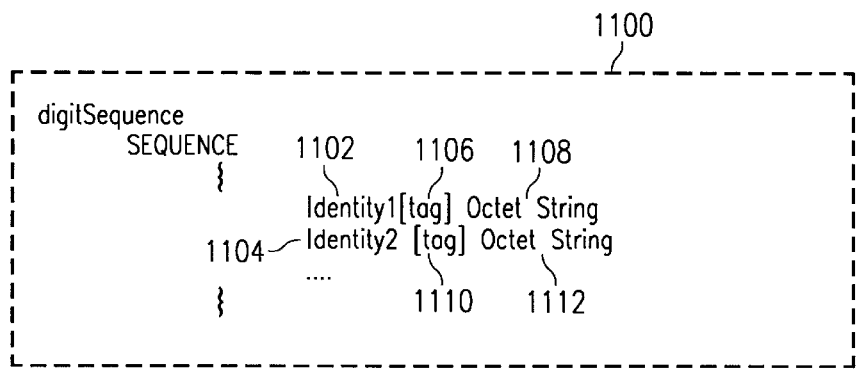
FIG. 11 is a data structure format for a digit sequence depicted in accordance with a preferred embodiment of the present invention.

In FIG. 11, a data structure format for a digit sequence is depicted in accordance with a preferred embodiment of the present invention. Digit sequence 1100 includes identities 1102 and 1104 in this example. Identity 1102 is identified with a tag 1106 followed by an octet string 1108. In this example, each octet string is used to contain a number. Each octet is divided into four bytes in which a number is contented in each of the bytes. Similarly, identity 1104 is identified with a tag 1110 followed by an octet string 1112. The actual size of the octet string may be network operator specific. Of course, other data structures or formats may be used depending on the implementation.

Figure 12:
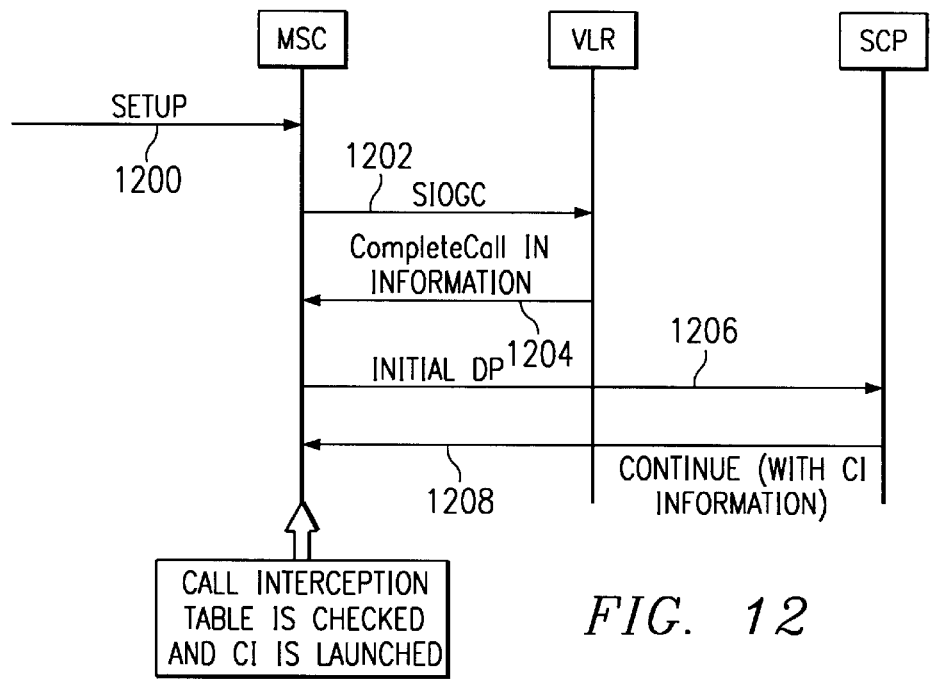
FIG. 12 is a message flow diagram for mobile originated IN call interception depicted in accordance with a preferred embodiment of the present invention.
Figure 13:
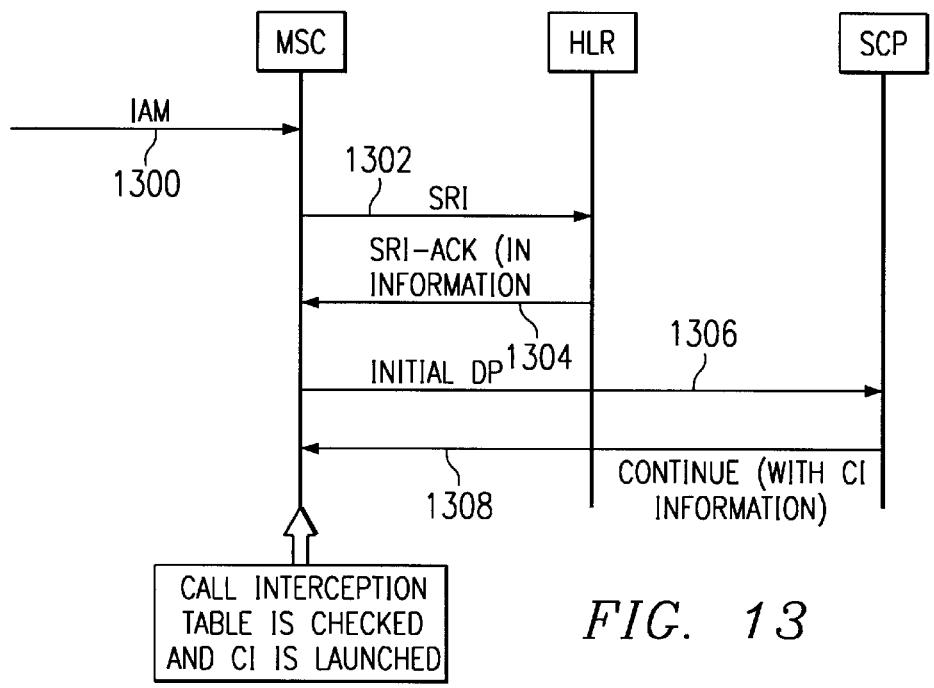
FIG. 13 is a message flow diagram for a mobile terminated IN call interception depicted in accordance with a preferred embodiment of the present invention.
Figure 14:
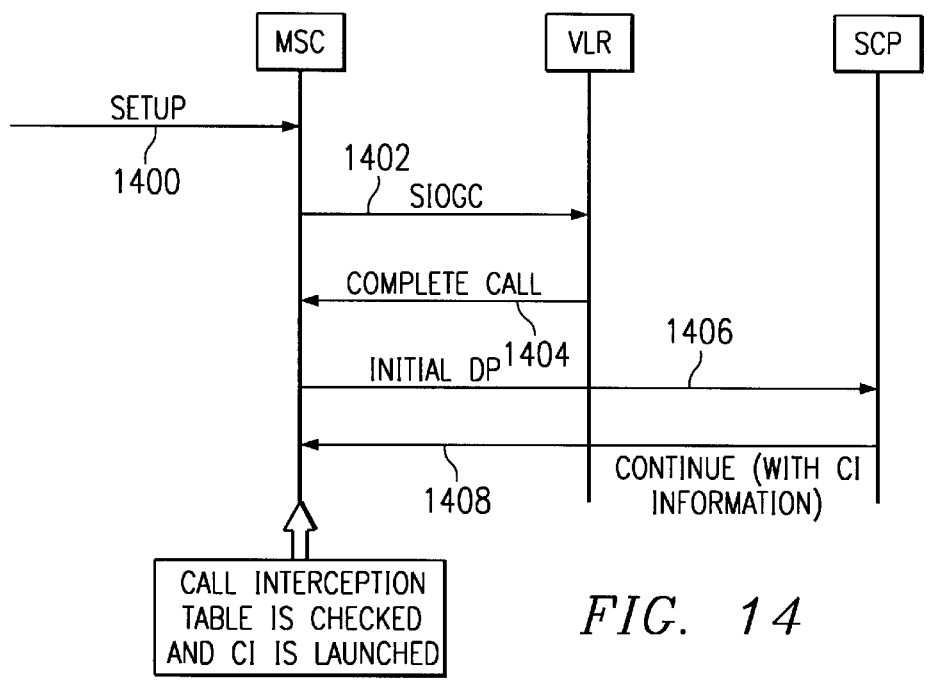
FIG. 14 is a message flow diagram for an origination IN call interception depicted in accordance with a preferred embodiment of the present invention.

The message flow diagrams in FIGS. 12–14 show messaging for the present invention and these messages are illustrated as GSM specific messages in these examples. With reference now to FIG. 12, a message flow diagram for mobile originated IN call interception is depicted in accordance with a preferred embodiment of the present invention. These originations may include, for example, prepaid, VPN, and sponsored call sponsored cell services. This message flow diagram illustrates messaging that occurs between a MSC and a SCP during a mobile station originated call interception involving an IN service.

In this example, a mobile station originates a call involving IN services. A setup message is sent to the MSC (step 1200). This setup message is initiated when a mobile station originates a call. Next, a send information for outgoing calls (SIOGC) message is sent from the MSC to the VLR associated with the MSC (step 1202). In response, the VLR will return a complete call message containing IN information (step 1204). If an IN service is involved, then an initial DP message is sent to the SCP from the MSC (step 1206). The initial DP message contains connection information that is sent to the SCP. For example, the called party number, the call origination, and other mobile station specific information may be sent. In this operation, connect information is sent to the SCP. In response, the SCP will return to the MSC a continue message (step 1208). This continue message contains call intercept information. In this example, the provisioned number for call intercept is included with the call intercept information returned by the SCP. With this call intercept information, a call intercept table is checked and a call intercept launched depending on the results.

With reference now to FIG. 13, a message flow diagram for a mobile terminated IN call interception is depicted in accordance with a preferred embodiment of the present invention. The message flow in FIG. 13, illustrates termination trigger by a detection point (DP) 12 in these examples. Detection points are software components specified by ITU-T recommendation G.1214 for use in IN services. These services include, for example, PNS, prepaid, and geo-zone services.

This message flow diagram illustrates messaging that occurs between a MSC and a SCP during a mobile station originated call interception involving an IN service. In this example, an initial address message (IAM) is sent from the mobile station to the MSC (step 1300). In response, the MSC will send a signal routing information (SRI) message to the HLR (step 1302). The HLR will return to the MSC a SRI acknowledgement (SRI-Ack) message containing IN information (step 1304). The MSC will send to the SCP an initial DP message (step 1306). In return, the SCP will return a continue message to the MSC. This message contains call intercept information (step 1308). Then, a call intercept table is checked and a call intercept may be launched.

With reference now to FIG. 14, a message flow diagram for an origination IN call interception is depicted in accordance with a preferred embodiment of the present invention. This message flow diagram illustrates messaging that may originate from any source, such as, for example, an office based trigger. In this example, a terminal originates a call involving IN services. A setup message is sent to the MSC (step 1400). This setup is initiated when the terminal originates a call. Next, a SIOGC is message is sent from the MSC to the VLR associated with the MSC (step 1402). In response, the VLR will return a complete call message (step 1404). The MSC then performs a switch to base translation. In this example, in the switch based translation, the MSC realizes that it cannot terminate the call because IN services are needed. Thereafter, an initial DP message is sent to the SCP (step 1406). A continue with call intercept information is returned from the SCP (step 1408).

Figure 15:
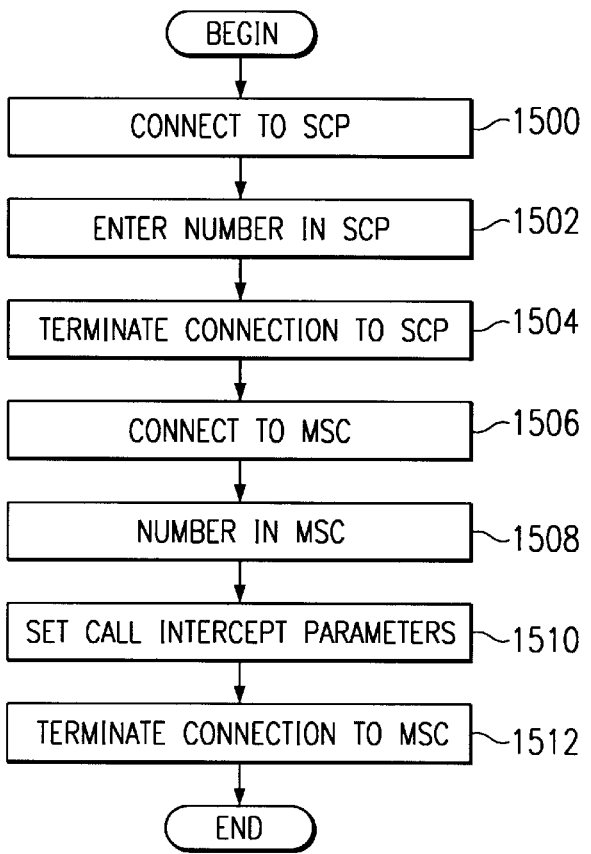
FIG. 15 is a flowchart of a process provisioning a number for call interception depicted in accordance with a preferred embodiment of the present invention.

With reference now to FIG. 15, a flowchart of a process provisioning a number for call interception is depicted in accordance with a preferred embodiment of the present invention. The process illustrated in FIG. 15 is implemented in a CIPC at which law enforcement agency personnel may provision numbers of suspects for call intercept. The process begins by connecting to a SCP (step 1500). Communication with the SCP is performed through SS7 protocols in this example. The number to the provisions is entered into the SCP (step 1502), and the connection to the SCP is terminated (step 1504).

Next, a connection is made to the MSC (step 1506). In this example, communication between a CIPC and the MSC is made through a TCP/IP protocol. The number is entered into the call intercept table (step 1508). Thereafter, various call intercept parameters may be entered (step 1510). These parameters may include, for example, the type of information to be collected during interception and monitoring of a call. The connection to the MSC is then terminated (step 1512) with the process terminating thereafter.

Figure 16:
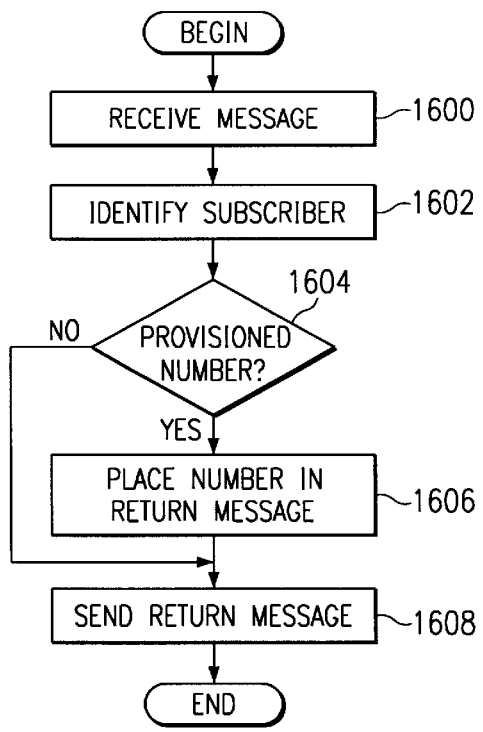
FIG. 16 is a flowchart of a process employed in a SCP to identify provision numbers depicted in accordance with a preferred embodiment of the present invention.

With reference now to FIG. 16, a flowchart of a process employed in a SCP to identify provision numbers is depicted in accordance with a preferred embodiment of the present invention. The process begins by receiving a message containing a number from the MSC (step 1600). In this example, the number may be a telephone number or could be a PIN and password used to access an IN service for the subscriber. Thereafter, the subscriber associated with the number is identified (step 1602). A determination is then made as to whether a provisioned number is present (step 1604). This determination may be made by querying the database at the SCP to determine if any numbers corresponding to the number received in the message has been provisioned. If the number is provisioned, the number is placed in a return message to MSC (step 1606). Thereafter, the return message is sent to the MSC (step 1608) with the process terminating thereafter. With reference again step 1604 if a provisioned number is not present that corresponds to the received number, the process proceeds to step 1608 to send the return message is sent to the MSC without any call intercept information.

Figure 17:
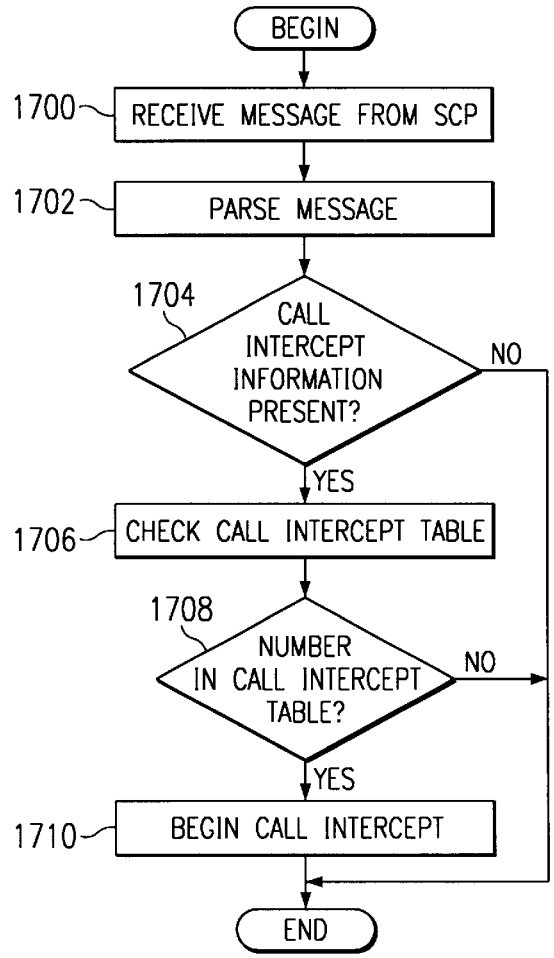
FIG. 17 is a flowchart of a process for initiating call intercept in a MSC depicted in accordance with a preferred embodiment of the present invention.

With reference to FIG. 17, a flowchart of a process for initiating call intercept in a MSC is depicted in accordance with a preferred embodiment of the present invention. The process begins by receiving a return message from the SCP (step 1700). Thereafter, the message is parsed (step 1702). A determination is made as to whether call intercept information is present in the parsed message (step 1704). If call intercept information is present, the call intercept table in the MSC is checked to see if an entry is present for the returned call intercept information (step 1706). A determination is made as to whether an entry is present for the call intercept information (step 1708). In this example, the call intercept information includes a number from the SCP. If an entry is present, then call intercept is initiated using the information within the entry (step 1710) with the process terminating thereafter. With reference again to step 1704, if call intercept information is absent, and if an entry is not present in step 1708, the process terminates.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted example is directed towards call intercept of calls involving IN services in a GSN network, the present invention may be applied to other types of services and communications networks. For example, the intercept of calls using the present invention may be applied to other services in which a subscriber may use or have identities not supported within a cellular or wireless network. Additionally, the present invention may be applied to other networks, such as, for example, a personal communication system (PCS) network. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a communications system for providing call interception comprising:
   receiving a call at a switch in the communications system, the call being associated with a first telephone number;
   responsive to the call involving a service, querying a remote database associated with the service, wherein the remote database contains one or more second telephone numbers associated with the first telephone number, wherein the one or more second telephone numbers are aliases for the first telephone number;
   receiving a result from the remote database in response to querying the remote database, the result including an identification of the one or more second telephone numbers;
   determining whether the result includes a second telephone number provisioned for call intercept services; and
   initiating call interception services based on the result.

2. The method of claim 1, wherein the services are intelligent network services.

3. The method of claim 1, wherein the communications system is a GSM network.

4. The method of claim 1, wherein the call is a receiving call.

5. The method of claim 1, wherein the call is an originating call.

6. The method of claim 1 further comprising:
   responsive to an absence of the call involving intelligent network services, querying a local database associated with the switch using the first telephone number;
   receiving a result from the local database in response to the query; and
   initiating call interception services in response to the result from the local database indicating that the first telephone number is provisioned for call interception.

7. The method of claim 1, wherein the switch is a mobile switching center.

8. The method of claim 1, wherein the steps of receiving a call, querying a remote database, receiving a result from the remote database, and initiating call interception services are performed in a switch.

9. A method for providing call interception of calls in a communications system comprising:
   receiving a call at a mobile switching center, wherein the call uses an intelligent network service, wherein the call includes a first telephone number;
   sending the number to a service control point in a message to initiate the intelligent network service;
   receiving a result from the service control point, the result including one or more second telephone numbers associated with the first telephone number, wherein the one or more second telephone numbers are aliases for the first telephone number;
   determining whether the result indicates that the call is to be monitored by having a second telephone number associated with call monitoring services; and
   responsive to the result indicating that the call is to be monitored, monitoring the call.

10. The method of claim 9, wherein the step of monitoring includes:
    sending call information to a destination.

11. The method of claim 9, wherein the call is originated by a mobile station within the communications system.

12. The method of claim 9, wherein the call is terminated at the mobile station within the communications system.

13. The method of claim 9, wherein the first telephone number is a local portability number.

14. The method of claim 9, wherein the first telephone number is a personal number service.

15. The method of claim 9, wherein the first telephone number is a virtual private number.

16. A communications system for providing call interception comprising:
    receiving means for receiving a call at a switch in the communications system, the call being associated with a first telephone number;
    querying means, responsive to the call involving a service, querying a remote database associated with the service, wherein the remote database contains one or more second telephone numbers associated with the first telephone number, wherein the one or more second telephone numbers are aliases for the first telephone number;
    receiving means for receiving a result from the remote database in response to querying the remote database, the result including an identification of the one or more second telephone numbers;
    determining means for determining whether the result includes a second telephone number provisioned for call intercept services; and
    initiating means for initiating call interception services based on the result.

17. The communications system of claim 16, wherein the services are intelligent network services.

18. The communications system of claim 16, wherein the communications system is a GSM network.

19. The communications system of claim 16, wherein the call is a receiving call.

20. The communications system of claim 16, wherein the call is an originating call.

21. The communications system of claim 16 further comprising:
    second querying means, responsive to an absence of the call involving intelligent network services, for querying a local database associated with the switch using the number;
    second receiving means for receiving a result from the local database in response to the query of the local database; and
    second initiating means for initiating call interception services in response to the result from the local database indicating that the number is provisioned for call interception.

22. The communications system of claim 16, wherein the switch is a mobile switching center.

23. A communications system for providing call interception of calls in the communications system comprising:
    first receiving means for receiving a call at a mobile switching center, wherein the call uses an intelligent network service, wherein the call includes a first telephone number;
    sending means for sending the first telephone number to a service control point in a message to initiate the intelligent network service;
    second receiving means for receiving a result from the service control point, the result including one or more second telephone numbers associated with the first telephone number, wherein the one or more second telephone numbers are aliases for the first telephone number;

determining means for determining whether the result indicates that the call is to be monitored by having a second telephone number associated with call monitoring services; and monitoring means, responsive to the result indicating that the call is to be monitored, for monitoring the call.

24. The communications system of claim 23, wherein the monitoring means includes:

sending means for sending call information to a destination.

25. The communications system of claim 23, wherein the call is originated by a mobile station within the communications system.

26. The communications system of claim 23, wherein the call is terminated at the mobile station within the communications system.

27. The communications system of claim 23, wherein the first telephone number is a local portability number.

28. The communications system of claim 23, wherein the first telephone number is a personal number service.

29. The communications system of claim 23, wherein the first telephone number is a virtual private number.

30. A method for intercepting a call in a wireless network, the method comprising:

provisioning a first number for a mobile station, wherein the first number is unused by the mobile switching center to identify a mobile station and wherein the first number is used to call the mobile station;

receiving a signal, at a mobile switching center, from the mobile station identifying the mobile station for a call;

sending a second number identifying the mobile station to another network;

receiving a result from the another network;

determining whether the first number is contained within the result; and responsive to the first number being contained within the result, initiating call intercept of the call.

31. A communications system comprising:

a database located in a network, wherein the database is used to provide a service, the database includes a first number and a second number, the first number and the second number are associated with a subscriber to the service, wherein the first number is an alias for the second number; and a switch located in a wireless communications network, wherein the first number is provisioned within the switch for call interception, and wherein in response to a call involving the second number, sending a first message to the database in the network, receiving a second message from the database, and initiating call interception of the call in response to the first number being returned in the second message.

32. A communications system for intercepting a call in a wireless network, the communications system comprising:

provisioning means for provisioning a first number for a mobile station, wherein the first number is unused by the mobile switching center to identify a mobile station and wherein the first number is used to call the mobile station;

first receiving means for receiving a signal, at a mobile switching center, from the mobile station identifying the mobile station for a call;

sending means for sending a second number identifying the mobile station to another network;

second receiving means for receiving a result from the another network;

determining means for determining whether the first number is contained within the result; and initiating means, responsive to the first number being contained within the result, for initiating call intercept of the call.

33. A method in a mobile switching center in a wireless communications system for intercepting a call, the method comprising:

provisioning a first number, wherein the first number is unused by the mobile switching center to identify mobile stations;

receiving a call, at the mobile switching center, from a mobile station, wherein the mobile station calls a second number involving a service provided by another network;

sending the second number to the another network;

receiving a result from the another network;

determining whether the first number is contained within the result; and responsive to the first number being contained within the result, initiating call intercept of the call.

34. The method of claim 33, wherein the step of initiating call intercept of the call includes:

identifying an agency that is to monitor the call using the first number.

35. The method of claim 33, wherein the another network is a SS7 network.

36. The method of claim 35, wherein the result is received from a service control point in the SS7 network.

37. A mobile switching center in a wireless communications system for intercepting a call, mobile switching center comprising:

provisioning means for provisioning a first number, wherein the first number is unused by the mobile switching center to identify mobile stations;

first receiving means for receiving a call, at the mobile switching center, from a mobile station, wherein the mobile station calls a second number involving a service provided by another network;

sending means for sending the second number to the another network;

second receiving means for receiving a result from the another network;

determining means for determining whether the first number is contained within the result; and initiating means, responsive to the first number being contained within the result, for initiating call intercept of the call.

38. The communications system of claim 37, wherein the initiating means of call intercept of the call includes:

identifying means for identifying an agency that is to monitor the call using the first number.

39. The communications system of claim 37, wherein the another network is a SS7 network.

40. The communications system of claim 39, wherein the result is received from a service control point in the SS7 network.

41. A wireless communications switch comprising:

an first adapter configured for connection to a base station controller;

a second adapter configured for communication with a database;

a switch fabric for switching calls;

a processing unit, wherein a target number has been provisioned to call interception and wherein the processing unit has a plurality of modes of operation including:

a first mode of operation in which the processing unit monitors for a call requiring an intelligent network service;

a second mode of operation, responsive to receiving the call requiring the intelligent network service, in which the processing unit identifies a called number for the call and sends the called number to the database using the second adapter; and a third mode of operation, responsive to receiving the target number from the database in response to sending the called number to the database, in which the processing unit initiates call interception of the call.

42. The wireless communications switch of claim 41, wherein the second communications adapter is configured to communicate with a service control point providing access to the database.

43. A service control point comprising:

a database, wherein the database includes an identification of a subscriber, a plurality of numbers associated with the subscriber, and an identification of a number within the plurality of numbers as a provisioned number;

a processing unit, wherein the processing unit has a plurality of modes of operation including:

a first mode of operation in which the processing unit monitors for a request from a requestor for a service, wherein request includes a called number;

a second mode of operation, responsive to receiving the request, in which the processing unit, determines the called number is part of the plurality of numbers including the provisioned number; and a third mode of operation, responsive to the called number being part of the plurality of numbers, returning the provisioned number to the requestor.

44. A computer program product in a computer readable medium in a communications system for providing call interception comprising:

first instructions for receiving a call at a switch in the communications system, the call being associated with a first telephone number;

second instructions, responsive to the call involving a service, for querying a remote database associated with the service, wherein the remote database contains one or more second telephone numbers associated with the first telephone number, wherein the one or more second telephone numbers are aliases for the first telephone number;

third instructions for receiving a result from the remote database in response to querying the remote database, the result including an identification of the one or more second telephone numbers;

fourth instructions for determining whether the result includes a second telephone number provisioned for call intercept services; and fifth instructions for initiating call interception services based on the result.

45. A computer program product in a computer readable medium for providing call interception of calls in a communications system comprising:

first instructions for receiving a call at a mobile switching center, wherein the call uses an intelligent network service, wherein the call includes a first telephone number;

second instructions for sending the number to a service control point in a message to initiate the intelligent network service;

third instructions for receiving a result from the service control point, the result including one or more second telephone numbers associated with the first telephone number, wherein the one or more second telephone numbers are aliases for the first telephone number;

fourth instructions for determining whether the result indicates that the call is to be monitored by having a second telephone number associated with call monitoring services; and fifth instructions, responsive to the result indicating that the call is to be monitored, for monitoring the call.

46. A computer program product in a computer readable medium in a mobile switching center in a wireless communications system for intercepting a call, the computer program product comprising:

first instructions for provisioning a first number, wherein the first number is unused by the mobile switching center to identify mobile stations;

second instructions for receiving a call, at the mobile switching center, from a mobile station, wherein the mobile station calls a second number involving a service provided by another network;

third instructions for sending the second number to the another network;

fourth instructions for receiving a result from the another network;

fifth instructions for determining whether the first number is contained within the result; and sixth instructions, responsive to the first number being contained within the result, for initiating call intercept of the call.

47. A computer program product in a computer readable medium for intercepting a call in a wireless network, the computer program product comprising:

first instructions for provisioning a first number for a mobile station, wherein the first number is unused by the mobile switching center to identify a mobile station and wherein the first number is used to call the mobile station;

second instructions for receiving a signal, at a mobile switching center, from the mobile station identifying the mobile station for a call;

third instructions for sending a second number identifying the mobile station to another network;

fourth instructions for receiving a result from the another network;

fifth instructions for determining whether the first number is contained within the result; and sixth instructions, responsive to the first number being contained within the result, for initiating call intercept of the call.

* * * * *